United States Patent [19]

Kennedy et al.

[11] Patent Number: 5,149,743
[45] Date of Patent: Sep. 22, 1992

[54] HALOGEN TERMINATED POLY (HALOSTYRENES) AND A PROCESS FOR THE PREPARATION THEREOF

[75] Inventors: Joseph P. Kennedy, Akron, Ohio; Miklos I. Zsuga, Debrecen, Hungary

[73] Assignee: The University of Akron, Akron, Ohio

[21] Appl. No.: 480,676

[22] Filed: Feb. 15, 1990

[51] Int. Cl.$^5$ .................. C08G 65/20; C08F 12/16
[52] U.S. Cl. ..................... 525/331.4; 525/330.7; 525/337; 525/340; 525/371; 525/385; 525/918; 526/221; 526/238; 526/291; 526/293
[58] Field of Search ............ 526/221, 237, 291, 293, 526/238; 525/330.7, 331.4, 385, 337, 385, 918, 340, 371

[56] References Cited

U.S. PATENT DOCUMENTS 4,870,144  9/1989  Noda et al. ............... 526/237 X

FOREIGN PATENT DOCUMENTS 62-79203  4/1987  Japan ......................... 526/293

OTHER PUBLICATIONS le Noble, Highlights of Organic Chemistry, Marcel Dekker, Inc., N.Y. (1974) pp. 223–225.

Trumbo & Harwood, "Analysis of the 300 MHz PMR . . . " (1987) Polymer Bulletin 18, 27–32.

Kennedy & Smith, "New Telechelic Polymers & Sequential . . . " Jour. Poly. Sci. vol. 18, 1523–1537 (1980).

Fehervari & Kennedy, "New Telechelic Polymers & . . . " J. Macromol. Sci.-Chem A15(2) 215–230 (1981).

Ivan, Kennedy & Change, "New Telechelic Polymers & . . . " Jour. Poly. Sci. vol. 18 3177–3191 (1980).

Wondraczek, Kennedy & Storey, "New Telechelic Polymers . . . " Jour. Poly. Sci. vol. 20 43–51 (1982).

Santos, Fehervari & Kennedy, "New Telechelic Polymers . . . " Jour. Poly. Sci. vol. 22 2685–2697 (1984).

Primary Examiner—Fred Teskin
Attorney, Agent, or Firm—Oldham, Oldham, & Wilson Co.

[57] ABSTRACT

Novel halostyrene telechelic polymers having from 2 to about 6 terminal halogens, halostyrene-polyether, block copolymers having ABA type structures in star type structures, depending on the number of halogen terminii in the starting halostyrene block, and a process for their formation is described. The halostyrene polymers are formed by the initiator transfer agent or inifer polymerization method; while the polyether block is polymerized by silver catalysis of monomers such as tetrahydrofuran. The polymers and copolymers have good flame resistance.

49 Claims, No Drawings

HALOGEN TERMINATED POLY (HALOSTYRENES) AND A PROCESS FOR THE PREPARATION THEREOF

TECHNICAL FIELD

The present invention relates to a novel class of halogen-terminated poly(halostyrenes) and block copolymers based on polyhalostyrene blocks and polyether blocks, and a process for the preparation of these polymers using the inifer polymerization technique.

In particular, this invention relates to a novel class of chlorine terminated poly(p-halostyrene) and block copolymers of poly(p-halostyrene) and a polyether block based on tetrahydrofuran or substituted tetrahydrofurans, and a process for the preparation of these polymers using the inifer polymerization technique.

More particularly, this invention relates to a novel class of chlorine terminated poly(p-fluorostyrene), poly(p-chlorostyrene), and poly(p-bromostyrene) and block copolymers of these poly(p-halostyrene) polymers and a polyether block based on tetrahydrofuran or substituted tetrahydrofurans, and a process for the preparation of these polymers using the inifer polymerization technique.

BACKGROUND OF THE INVENTION

Polymerization of poly(halostyrene) has been achieved using free-radical and anionic polymerization techniques.

Hayword et al. recently reported in *Polymer Bulletin* 18, 27 (1987), the results of some special types of radical polymerization methods for polymerizing p-chlorostyrene. However, these methods were unsuitable for making polymers with well defined molecular weights and/or molecular weight distributions.

Burnett et al. in *Eur. Polym. J.* 2, 329 (1966), reported the anionic polymerization of p-chlorostyrene. However, because of the chlorine unit on the aromatic ring, polymerization had to be carried out at extremely low temperatures and the polymer structure was not well-defined, indicating that the reaction did not proceed in a satisfactory manner.

The synthesis of chlorine-capped telechelic polymers by the inifer method has been described in great detail in the following references:

1. J.P. Kennedy and R.A. Smith, *J. Polym. Sci., Polym. Chem. Ed.* 18, 1523 (1980);
2. A Fehervari, J.P. Kennedy and F. Tudos, *J. Macromol. Sci., Chem.,* A15(2), 215 (1981);
3. B. Ivan, J.P. Kennedy and V.S.C. Chang, *J. Polym. Sci., Chem Ed.,* 18, 3177 (1980);
4. R.H. Wondraczek, J.P. Kennedy and R.F. Storey, *J. Polym. Sci., Polym Chem Ed.,* 20, 43 (1982); and
5. R. Santos, A. Fehervari and J.P. Kennedy, *J. Polym. Sci., Polym. Chem. Ed.,* 22, 2685 (1984).

These polymerization methods have also been the subject of numerous patents covering different types of polymerization aspects involving the inifer method:

Kennedy et al., U.S. Pat. No. 4,276,394
Kennedy et al., U.S. Pat. No. 4,316,973

For example, Kennedy in U.S. Pat. No. 4,276,394 disclosed the use of the inifer method to polymerize novel telechelic polymers having a chlorine terminus. These polymers involve the use of isobutylene as the polymerizable monomer and taught the use of other alpha olefins to form telechelic polymers terminating in chlorine groups using binifers as one type of initiator for the inifer polymerization method. However, in "Carbocationic Polymerization", John Wiley and Sons, New York (1982), Kennedy and co-workers indicated that the polymerization of p-chlorostyrene would be slow and difficult and would not be easily attainable.

Cationic polymerization of styrene type monomers has often been plagued with the problem of the formation of indane ring type end structures. The indane type ring system is formed by self alkylation of the aromatic ring by the cationic terminus. Indane ring systems are disadvantageous because the indane ring systems interfere with telechelic end group formation.

It thus appears to be desirable to manufacture a chlorine telechelic polymer based on poly(p-halostyrene) from the inifer method, especially chlorine terminated telechelic polymers based on halostyrenes which have little to no indane contamination. These polymers are useful because of their inflammability, their optical properties, and their chemical resistance properties. This makes them ideally suited for use in gaskets, in optically clear films that are thermally stable, oxidatively stable and inflammable and in other applications requiring inflammable, chemically resistant and/or optically clear films.

DESCRIPTION OF THE INVENTION

It is the object of the present invention to provide novel telechelic polymers formed from a cationically polymerizable halostyrene monomer and having at least two halogen substituted benzylhalide termini.

It is a further object of this invention to provide novel telechelic, halogenated polymers such as $\alpha,\omega$-dichloropoly(p-halostyrenes).

It is a further object of this invention to provide a process for the synthesis of a telechelic halogen-terminated poly(halostyrene) that involves the use of an inifer, that is a compound capable of polymerization initiation and chain transfer.

It is a further object of the present invention to provide a process for the synthesis of telechelic halogen-terminated poly(halostyrene) utilizing an inifer so as to avoid chain transfer to monomer.

It is a further aspect of this invention to polymerize halogenated styrene derivatives so as to preclude the formation of indane structures during initiation and polymerization. The reduction of indane formation can be achieved either by using a sterically hindered binifer or by lowering the reaction temperature below minus 55° C when utilizing a less sterically congested binifer.

It is a further object of this invention to provide a process for the synthesis of novel telechelic polymers of halogenated styrenes where the molecular weight distribution and the end group structure can be controlled.

A still further aspect of this invention is to provide novel telechelic polymers from cationically polymerizable p-chlorostyrene monomer and having at least two p-chlorobenzylchloride termini.

A still further aspect of this invention is to provide novel telechelic polymers from cationically polymerizable p-fluorostyrene monomer and having at least two p-fluorobenzylchloride termini.

These and other objects and aspects, together with the advantages thereof over the prior art, which shall become apparent from the specification which follows, are accomplished by our invention as herein described and claimed.

The term telechelic polymer is intended to mean a polymer which has one or more reactive end groups of a particular and pre-determined type. The term telechelic polymer is synonymous with the term halogen-terminated polymer herein.

The novel telechelic polymers or halogen-terminated polymers of the present invention are prepared by polymerizing halostyrene monomers selected from the representative and illustrative group consisting of:

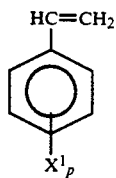
(i)

where $X^1$ is F, Cl or Br and $p$ is an integer having a numeric value from 1 to 3 and each $X^1$ is in either a meta or para position relative to the vinyl group; and

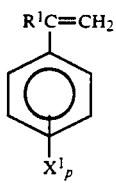
(ii)

where $X^1$ is F, Cl or Br, $p$ is an integer having a numeric value from 1 to 3 and $R^1$ is selected from the group consisting of a linear or branched alkyl group having from 1 to 12 carbon atoms, a cyclic alkyl group having from 5 to 8 carbon atoms and an aryl group having from 6 to 14 carbon atoms and where each $X^1$ is in either a meta or para position relative to the vinyl group under conditions to afford an inifer polymerization. Inifer polymerization condition include contacting a monomer and an inifer in the presence of a fully halogenated Friedel-Crafts coinitiator in an inert atmosphere for a time sufficient to yield a polymer of a desired molecular weight and at a temperature from about −100° C. to about −20° C.

The term telechelic as used herein is indicative of a terminally functionalized polymer i.e., the end groups or the terminal groups of the polymer are of a specific predetermined type. In the present invention, the end groups are halogenated-benzyl halides as shown in Formula (I):

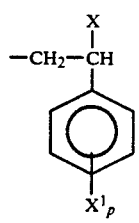
(I)

where $X^1$ and $p$ are as previously defined and X is F, cl or Br.

Because the telechelic polymers are made from inifers which can contain from 2 up to about 6 active initiating sites for cationic polymerization, the polymers formed in this type of an inifer reaction can have from 2 to about 6 arms, each terminating in an end group as described by Formula (I). The inifer that is used in this invention determines the number of branches or arms in the resulting polymer. Thus, an inifer with two active initiating sites will produce a linear polymer (two armed polymer), an inifer with three active initiating sites will produce a three armed polymer and so on.

There are two classes of inifers usable in the present invention. The first class is sterically hindered inifers. Sterically hindered inifers are selected from the representative and illustrative group consisting of:

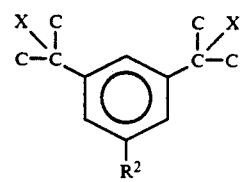
(a)

where $R^2$ is an alkyl group having from 1 to 5 carbon atoms, or a cycloalkyl group having from 4 to 8 carbon atoms, and where X is chlorine or bromine; and

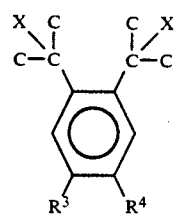
(b)

where $R^3$ and $R^4$ can be the same or different, wherein $R^3$ and $R^4$ are an alkyl group having from 1 to 5 carbon atoms, or a cycloalkyl group having from 4 to 8 carbon atoms, and where X is chlorine or bromine.

The second class of inifers is non-sterically hindered inifers. Non-sterically hindered inifers are selected from the representative and illustrative group consisting of $AY_n$, BZ, and oligomers of α-chlorostyrene having from 2 to 6 units; where A is selected from the group consisting of condensed and non-condensed aromatic compounds having from 1 to 4 rings, linear and branched aliphatic compounds having from 3 to 20 carbon atoms; where Y is represented by the formula

where $R^5$ and $R^6$ are selected from the group consisting of hydrogen, methyl, phenyl and $R^5$ and $R^6$ can be the same when A is an aromatic compound or where $R^5$ is phenyl when A is an aliphatic compound and where $X^2$ is a halogen selected from the group consisting of fluorine, chlorine and bromine and where n is in integer having a numeric value from 2 to 6; where B is selected from hydrocarbons having 8 to 20 carbon atoms and where Z is a tertiary halogen selected from the group consisting of tertiary fluorine, tertiary chlorine or tertiary bromine.

Polymers of the present invention, because they are initiated by the inifer polymerization method, will contain the inifer in the molecular structure of the polymer. Because the number of units of halostyrenes that are polymerized to comprise the arms of the polymer, are substantially greater than the single initiating species, molecular weights are calculated with the exclusion of the difference between the monomer weight and the inifer weight. The inifer is simply considered a monomer unit for $M_W$ and $M_n$ determination. Therefore, the molecular weight of a linear poly(halostyrene) will range from about 1,000 to 100,000 while that of a tri-star will range from about 3,000 to 150,000 absent a consideration of the inifer contribution.

Block copolymers of the present invention represent novel block copolymers with an inner flame-retardant halostyrene block and outer blocks of polyethers. Because the starting polymer is a telechelic polymer based on a halostyrene monomer and having from 2 to 6 arms substantially symmetrical to the inifer in the middle, the block copolymers will have $G(AB)_n$ type structures where B represents the inner halostyrene block and A represents the polyether outer block and G represent the inifer at the middle of the polymer structure and where $_n$ is an integer having a numeric value from 2 to 6. When $_n$ is 2, the resulting polymer has the standard ABA block co-polymer structure with the inifer in the middle of the B block.

In general, the process of the present invention for the synthesis of a halogen-terminated poly(halostyrene) comprises the steps of contacting a halogenated styrene monomer with either a sterically hindered or a non-sterically hindered inifer as described above, in the presence of a solution of a fully chlorinated metal chloride Friedel-Crafts acid coinitiator in a solvent for a time sufficient to effect formation of said polymer with a molecular weight from about 1,000 to 100,000 said time from about 10 minutes to about 6 hours and at a temperature sufficient to suppress indane ring formation from about $-100°$ C. to about $-28°$ C. for said sterically hindered inifers and from about -100° C. to about -60° C. said non-sterically hindered inifers. It should be recognized that the upper limit on the temperature ($-28°$ C.) represents the reflux temperature of the reaction system. The reflux temperature of a reaction system is a well defined temperature when the whole system is gently boiling under atmospheric pressure and will vary from system to system. The preferable polymer molecular weight is from about 2,000 to about 75,000, with 5,000 to 50,000 being particularly preferred.

The fully chlorinated metal chloride Friedel-Crafts acid coinitiators useful for carrying out the above process are selected from the representative and illustrative group consisting of $BCl_3$, $SnCl_4$, $TiCl_4$, $SbCl_6$, and $FeCl_3$. The solvents useful in the above process are selected from the representative and illustrative group consisting of chloromethane, dichloromethane, chloroform, carbon tetrachloride and other chlorinated hydrocarbon solvents.

In general, the process of the present invention for the synthesis of a block copolymer having a poly(halostyrene) block and a polyether block polymer comprises the steps of contacting a halogenated styrene monomer with either a sterically hindered or a non-sterically hindered inifer as described above, in the presence of a solution of a fully chlorinated metal chloride Friedel-Crafts acid coinitiator in a first solvent for a time sufficient to effect formation of a first block of said polymer with a molecular weight between about 1,000 and about 100,000 said time from about 10 minutes to about 6 hours and at a temperature sufficient to suppress indane ring formation from about $-100°$ C. to about $-60°$ C. for said non-sterically hindered inifers and from about $-100°$ to $-28°$ C. for said sterically hindered inifers; isolating said first block from said solvent by treatment with a coagulating solvent; dissolving said halogen-terminated halogenated styrene telechelic first block in a second solvent; contacting said dissolved first block with a ring opening polymerizable monomer in the presence of a catalyst for a time sufficient to polymerize a second block having a molecular weight between 1,000 and 100,000 said time from about 10 minutes to about 6 hours at a temperature sufficient to facilitate polymerization of the ring opening polymerizable monomer from about 0° C. to about 60° C. in a dry nitrogen atmosphere. The preferred molecular weight of the first block is from about 2,000 to 75,000 and particularly from about 5,000 to 50,000. The preferred molecular weight of the second block is from about 2,000 to about 75,000 and particularly from about 5,000 to about 50,000.

The fully chlorinated metal chloride Friedel-Crafts acid coinitiators useful for carrying out the above process are the same as previously described in the previous process. The ring opening polymerizable monomer is tetrahydrofuran. The first solvent in the above process is the same as the solvent in the previous process. The second solvent in the above example can be and same as the first solvent or the second solvent can be the ring opening polymerizable monomer (tetrahydrofuran) or alkylated tetrahydrofurans. The catalyst is selected from the group consisting of silver hexafluorophosphate, $AgClO_4$, and $AgBF_4$.

It should be understood that the term halogen-terminated halogenated styrene telechelic polymer is the same as halogen-terminated poly(halostyrene) polymers as used herein.

BEST MODE FOR CARRYING OUT THE INVENTION

Applicants have found that the inifer polymerization method successfully polymerizes halostyrene monomers to produce benzyl halide terminated telechelic polymers having flame retardant properties. These polymers can be made with controlled molecular weights, molecular weight distributions and functional end group which can be subjected to secondary polymerization condition to produce novel ABA block copolymers. The polymers of present invention can also be produced with little to no indane ring contamination. Indane ring formation is a frequent side reaction which plagues final polymer properties of styrene polymers produced by cationic methods including the inifer method. The suppression of indane ring formation for non-sterically hindered inifers is accomplished by strict temperature control at temperatures below $-60°$ C., while indane suppression can also be accomplished by using sterically hindered inifers at temperatures up to $-28°$ C.

The particularly preferred non-sterically hindered inifer useful in the present invention is 1,4-di-(2-chloro-2-propyl)benzene sometimes herein abbreviated as DCC. The particularly preferred sterically hindered inifer useful in the present invention is 1,3-di-(2-chloro-2-propyl)-5-tert-butylbenzene sometimes herein abbreviated as BDCC. Thus, the composition resulting from the polymerization comprises a polyhalostyrene chain having the inifer residue in the center and having a structure such that the polymer arms are symmetrically disposed with respect to the inifer at the center of the polymer and terminating is a end group of formula (I).

The halostyrenes that are particularly preferred in the present invention are p-chlorostyrene and p-fluorostyrene. However, other halostyrenes of formula (a) can also be used, such as difluorostyrenes where each fluorine atom is in either a meta or para position with respect to the vinyl group of the styrene molecule, 3,4,5-trifluorostyrene, dichlorostyrenes where each chlorine atom is in either a meta or para position relative to the vinyl group of the styrene molecule, 3,4,5-trichlorostyrene, p-bromostyrene, dibromostyrenes where each bromine atom is in either a meta or para position relative to the vinyl group of the styrene molecule,. Besides the halogenated styrenes that are mentioned above, halogenated α-methylstyrenes of formula (b) also represent useful monomers in the synthesis of flame resistant and fuel resistant polymers as envisioned in the above description according to the present invention.

The present invention is further illustrated by the following representative examples:

EXAMPLE 1

General Polymerization Procedure

The polymerizations are carried out under a dry nitrogen atmosphere in a stainless steel dry box.

Into a large culture tube (75mL in volume) which served as the polymerization reactor, 25mL pure pre-cooled methyl chloride, 2.216 g of p-chlorostyrene and varying amounts of either initiator 1,4-di(2-chloro-2-propyl) benzene (DCC) or 1,3-di-(2-chloro-2-propyl) 5-tert-butyl benzene (BDCC) were charged. The temperature was maintained at either −60° C., when the initiator system is DCC, or −35° C. when the initiator system was BDCC. The polymerizations were started by fast introduction of 0.66 g of boron trichloride under very intensive mixing.

EXAMPLE 2

This example describes a set of five polymerizations following the procedure described in Example 1 where the initiator concentration of DCC is varied from 1.07 millimoles per liter to 16.99 millimoles per liter. In addition, a polymerization was carried out in the absence of DCC as a comparison. The results of the reaction are shown below in Table I.

TABLE I

Polymerization of p-chlorostyrene by pDCC and $BCl_3/CH_2Cl$ systems

| $[DCC]^a$ mole/L.$10^3$ | Conv. % | $M_n$ g/mole | $M_w/M_n$ | $I_{eff}$ % |
|---|---|---|---|---|
| 1.07 | 21.1 | 20,200 | 1.74 | 91 |
| 3.51 | 46.2 | 13,300 | 1.70 | 85 |
| 8.26 | 61.7 | 8,700 | 1.70 | 78 |
| 10.77 | 67.3 | 7,300 | 1.76 | 78 |
| 16.99 | 71.5 | 5,700 | 1.68 | 65 |
| — | $1.3^b$ | 38,700 | 2.47 | — |

$^a$−60° C., [pClSt] = 0.64 mole/L
$^b$[DCC] = 0, −35° C.

The polymerizations were stopped at low conversions in order to determine the inifer efficiency as indicated in the last column of Table I. By increasing the reaction time to 60 minutes, the reactions go to completion. The table shows that conversions at low inifer concentrations are low and rise continuously with increasing inifer concentration with the exact opposite trend being seen by the molecular weight. That is, as the inifer concentration goes up, molecular weight goes down.

The molecular weight distribution is seen to be quite narrow, ranging between 1.68 and 1.78. The inifer efficiencies range between 65–91%. Again, by increasing the reaction time to 60 minutes, all of these reactions go to 100% completion. Comparing the non-inifer polymerization (no added DCC) results to the inifer polymerization results shows a marked increase in conversion from 1.3% for the non-inifer method to between 65–91% for the inifer method. The comparison also shows that the inifer method produces a narrower molecular weight distribution (2.47 in the case of the non-inifer method and from about 1.5 to about 1.8 in the case of the inifer method).

EXAMPLE 3

This example is a series of reactions in which the BDCC initiator was used and its concentration was varied from 1.18 millimoles to 11.76 millimoles per liter. Along with the results of this reaction, is a comparison of the polymerization done in the absence of the BDCC initiator. The results of these experiments are shown in Table II.

TABLE II

Polymerization of p-chlorostyrene by $BDCC/BCl_3/CH_2Cl$

| $[BuDCC]^a$ mole/L.$10^3$ | Conv. % | $M_n$ g/mole | $M_w/M_n$ | $I_{eff}$ % |
|---|---|---|---|---|
| 1.18 | 48.4 | 20,530 | 1.93 | 109 |
| 3.52 | 57.7 | 10,400 | 2.13 | 94 |
| 5.88 | 74.8 | 8,100 | 2.20 | 94 |
| 9.40 | 80.6 | 6,160 | 2.18 | 83 |
| 11.76 | 86.7 | 5,700 | 2.18 | 78 |
| — | $1.3^b$ | 38,700 | 2.47 | — |

$^a$−35° C., [pClSt] = 0.43 mole/L
$^b$[BDCC] = 0, −35° C.

As can be seen from Table II, as one increases the inifer concentration, molecular weight of the polyparachlorostyrene decreases proportionally. Also, as one increases the inifer concentration, the conversion goes up. The molecular weight distribution is higher in the case of the sterically hindered inifer ranging from about 1.8 to 2.3 than in the case of the non-sterically hindered inifers, but the molecular weight distribution is lower than the 2.47 value attained by the reaction in the absence of BDCC. Again the inifer polymerization will go to 100% completion if the time of polymerization is increased to approximately one hour.

EXAMPLE 4

This example illustrate the preparation of a poly(p-chlorostyrene)-polyether block copolymer. The polyether block is based on tetrahydrofuran and the block polymerization is catalyzed by $AgPF_6$.

In a 100 mL two neck, round bottom flask, fitted with a stirrer, 0.2 grams of a telechelic polymer prepared according to Example 1 with a number average molecular weight of 3150 was dissolved in 10 mL of tetrahydrofuran (THF) (freshly distilled over $CaH_2$) and the polymerization was started by adding a solution of 0.1 grams of $AgPF_6$ dissolved in 10 mL THF at room temperature under a dry nitrogen atmosphere in a dry box. After 5 hours the polymerization was stopped by the addition of a few mL of methanol and the solvents were evaporated. The product was dissolved in methylene chloride and precipitated into ethanol. The $I_{eff}=(W_1/M_{n1})/(W_2/M_{n2})*100$ (where the * means multiply) was found to be 89% where $W_1$=weight of block copolymer, $W_2$=weight of poly(p-chlorostyrene), $M_{n1}$=number average molecular weight of block copolymer, and $M_{n2}$=number average molecular weight of poly(p-chlorostyrene).

The above example are illustrative only and the above procedure can be performed by substitution of any of the other halostyrenes.

What is claimed is:

1. A process for the synthesis of halogen-terminated poly(halostyrenes) polymer comprising the steps of contacting a halostyrene monomer with a sterically hindered inifer selected from the group consisting of the formulas (a) and (b)

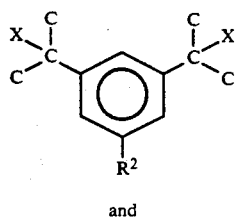
(a)

and

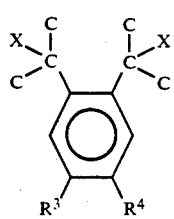
(b)

where $R^2$ in formula (a) is an alkyl group having from 1 to 5 carbon atoms, or a cycloalkyl group having from 4 to 8 carbon atoms, and where $R^3$ and $R^4$ in formula (b) can be the same or different, wherein $R^3$ and $R^4$ are an alkyl group having from 1 to 5 carbon atoms, or a cycloalkyl group having from 4 to 8 carbon atoms, and where X is chlorine or bromine, in the presence of a solution of a fully chlorinated metal chloride Friedel-Crafts acid coinitiator in a solvent for a time sufficient to effect formation of said polymer and at a temperature sufficient to suppress indane ring formation.

2. A process according to claim 1, wherein said halostyrene monomer is selected from the group consisting of formulas (i) and (II)

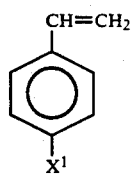
(i)

and

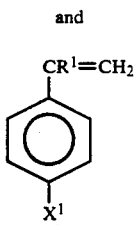
(ii)

where $X^1$ is F, Cl or Br, $R^1$ is selected from the group consisting of a linear or branched alkyl group having from 1 to 12 carbon atoms, a cyclic alkyl group having from 5 to 8 carbon atoms and an aryl group having from 6 to 14 carbon atoms and where each $X^1$ is in a para position relative to the vinyl group of formula (i) or is in a para position relative to the substituted vinyl group of formula(ii).

3. A process according to claim 2, wherein said halostyrene monomer being of formula (i).

4. A process according to claim 3, wherein said halostyrene monomer is selected from the group consisting of p-fluorostyrene, p-chlorostyrene and p-bromostyrene.

5. A process according to claim 4, wherein said halostyrene monomer is p-fluorostyrene.

6. A process according to claim 4, wherein said halostyrene monomer is p-chlorostyrene.

7. A process according to claim 4, wherein said halostyrene monomer is p-bromostyrene.

8. A process according to claim 2, wherein said halostyrene monomer being of formula (ii).

9. A process according to claim 1, wherein said temperature is from about $-100°$ C. to the reflux temperature of the reaction system.

10. A process according to claim 1, wherein said sterically hindered inifer being of the formula (a).

11. A process according to claim 10, wherein said sterically hindered inifer is 1,3-di-(2-chloro-2-propyl)-tert-butylbenzene.

12. A process according to claim 1, wherein said sterically hindered inifer being of the formula (b).

13. A process according to claim 1, said solvent being selected from the group consisting of chloromethane, methylene chloride, chloroform, carbon tetrachloride, and other chlorinated hydrocarbons having boiling points from about $-20°$ C. and $100°$ C.

14. A process according to claim 1, wherein said polymer has a molecular weight from about 1,000 to 100,000.

15. A process according to claim 14, wherein said polymer has a molecular weight from about 2,000 to 75,000.

16. A process according to claim 15, wherein said polymer has a molecular weight from about 5,000 to 50,000.

17. A process according to claim 1, wherein said time is from about 10 minutes to about 6 hours.

18. A novel telechelic polymer formed from an inifer and a halostyrene monomer, said polymer having a residue of a sterically hindered inifer selected from the group consisting of formulas (a) and (b)

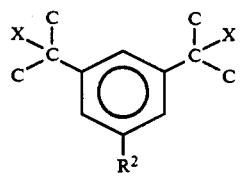
(a)

and

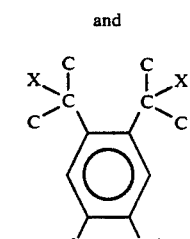
(b)

where $R^2$ in formula (a) is an alkyl group having from 1 to 5 carbon atoms, or a cycloalkyl group having from 4 to 8 carbon atoms, and where $R^3$ and $R^4$ in formula (b) can be the same or different, wherein $R^3$ and $R^4$ are an alkyl group having from 1 to 5 carbon atoms, or a cycloalkyl group having from 4 to 8 carbon atoms, and where X is chlorine or bromine, in the backbone thereof and carrying at least 2 halobenzyl halide termini and no detectable indane ring systems.

19. The polymer according to claim 18, wherein said halostyrene monomer is selected from the group consisting of formulas (i) and (ii)

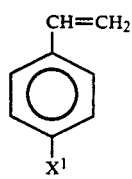     (i)

and

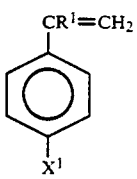     (ii)

where $X^1$ is F, Cl or Br, $R^1$ is selected from the group consisting of a linear or branched alkyl group having from 1 to 12 carbon atoms, a cyclic alkyl group having from 5 to 8 carbon atoms and an aryl group having from 6 to 14 carbon atoms and where each $X^1$ is in a para position relative to the vinyl group of formula (i) or is in a para position relative to the substituted vinyl group of formula (ii).

20. A process for the synthesis of a block copolymer comprising the steps of:
contacting a halostyrene monomer with a sterically hindered inifer selected from the group consisting of formulas (a) and (b)

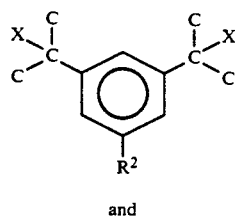     (a)

and

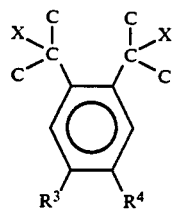     (b)

where $R^2$ in formula (a) is an alkyl group having from 1 to 5 carbon atoms, or a cycloalkyl group having from 4 to 8 carbon atoms, and where $R^3$ and $R^4$ in formula (b) can be the same or different, wherein $R^3$ and $R^4$ are an alkyl group having from 1 to 5 carbon atoms, or a cycloalkyl group having from 4 to 8 carbon atoms, and where X is chlorine or bromine, in the presence of a solution of a fully chlorinated metal chloride Friedel-Crafts acid coinitiator in a first solvent for a first time sufficient to form a first block of said copolymer and at a first temperature sufficient to suppress indane ring formation;

isolating said first block from said solvent by treatment with a coagulating solvent;

dissolving said first block in a second solvent; and contacting said dissolved first block with a ring opening polymerizable monomer in the presence of a catalyst for a second time sufficient to polymerize a second block of said copolymer at a second temperature to facilitate polymerization of said second block in a dry nitrogen atmosphere.

21. A process according to claim 20, wherein said halostyrene monomer is selected from the group consisting of formulas (i) and (ii)

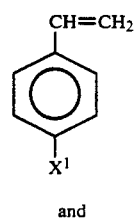     (i)

and

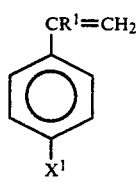     (ii)

where $X^1$ is F, Cl or Br, $R^1$ is selected from the group consisting of a linear or branched alkyl group having from 1 to 12 carbon atoms, a cyclic alkyl group having from 5 to 8 carbon atoms and an aryl group having from 6 to 14 carbon atoms and where each $C^1$ is in a para position relative to the vinyl group of formula (i) or is in a para position relative to the substituted vinyl group of formula (ii).

22. A process according to claim 21, wherein said halostyrene monomer being of formula (i).

23. A process according to claim 22, wherein said halostyrene monomer is selected from the group consisting of p-fluorostyrene, p-chlorostyrene and p-bromostyrene.

24. A process according to claim 23, wherein said halostyrene monomer is p-fluorostyrene.

25. A process according to claim 23, wherein said halostyrene monomer is p-chlorostyrene.

26. A process according to claim 23, wherein said halostyrene monomer is p-bromostyrene.

27. A process according to claim 21, wherein said halostyrene monomer being of formula (ii).

28. A process according to claim 20, wherein said first temperature is from about $-100°$ C. to the reflux temperature of the reaction system.

29. A process according to claim 20, wherein said sterically hindered inifer being of the formula (a).

30. A process according to claim 29, wherein said sterically hindered inifer is 1,3-di-(2-chloro-2-propyl)-tert-butylbenzene.

31. A process according to claim 20, wherein said sterically hindered inifer being of the formula (b).

32. A process according to claim 20, wherein said first block has a molecular weight from about 1,000 to 100,000.

33. A process according to claim 32, wherein said first block has a molecular weight from about 2,000 to 75,000.

34. A process according to claim 33, wherein said first block has a molecular weight from about 5,000 to 50,000.

35. A process according to claim 20, wherein said first time is from about 10 minutes to about 6 hours.

36. A process according to claim 20, wherein said second block has a molecular weight from about 1,000 to about 100,000.

37. A process according to claim 20, wherein said second block has a molecular weight from about 2,000 to about 75,000.

38. A process according to claim 20, wherein said second block has a molecular weight from about 5,000 to about 50,000.

39. A process according to claim 20, wherein said second time ranging from about 10 minutes to about 6 hours.

40. A process according to claim 20, wherein said second temperature ranging from about 0° C. to about 60° C.

41. A process according to claim 20, said ring opening polymerizable monomer is tetrahydrofuran.

42. A process according to claim 20, said catalyst is selected from the group consisting of silver hexafluorophosphate, AgClO₄, and AgBF₄.

43. A process according to claim 20, said first solvent selected from the group consisting of chloromethane, methylene chloride, chloroform, carbon tetrachloride, and other chlorinated hydrocarbons having a boiling point from about −20° C. to about 100° C.

44. A process according to claim 20, said coagulating solvent being selected from the group consisting of methanol, ethanol, isopropanol, propanol, butanol, and isobutanol.

45. A process according to claim 20, said second solvent selected from the group consisting of chloromethane, methylene chloride, chloroform, carbon tetrachloride, other chlorinated hydrocarbons having a boiling point from about −20° C. to about 100° C., tetrahydrofuran, and alkylated tetrahydrofurans.

46. A process according to claim 20, wherein said ring opening polymerizable monomer is tetrahydrofuran.

47. A novel block copolymer comprising, a central or first block formed from a cationically polymerizable halostyrene monomer, said central block having a residue of a sterically hindered inifer selected from the group consisting of formulas (a) and (b)

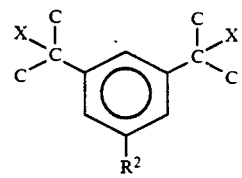

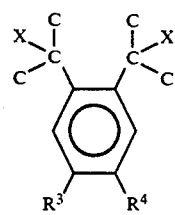

where $R^2$ in formula (a) is an alkyl group having from 1 to 5 carbon atoms, or a cycloalkyl group having from 4 to 8 carbon atoms, and where $R^3$ and $R^4$ in formula (b) can be the same or different, wherein $R^3$ and $R^4$ are an alkyl group having from 1 to 5 carbon atoms, or a cycloalkyl group having from 4 to 8 carbon atoms, and where X is chlorine or bromine, in the backbone thereof, having no detectable indane ring systems therein, and having at least two ends, each end carrying an outer or second block polymer moiety formed from a ring opening polymerizable monomer.

48. The polymer according to claim 47, wherein said halostyrene monomer is selected from the group consisting of formulas (i) and (ii)

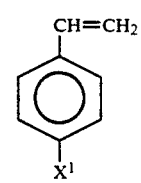

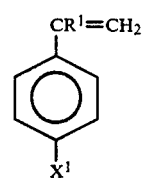

where $X^1$ is F, Cl or Br, $R^1$ is selected from the group consisting of a linear or branched alkyl group having from 1 to 12 carbon atoms, a cyclic alkyl group having from 5 to 8 carbon atoms and an aryl group having from 6 to 14 carbon atoms and where each $X^1$ is in a para position relative to the vinyl group of formula (i) or is in a para position relative to the substituted vinyl group of formula (ii).

49. The polymer according to claim 47, said ring opening polymerizable monomer selected from the group consisting of tetrahydrofuran and alkylated tetrahydrofurans where the alkyl group or groups have from 1 to 6 carbon atoms and may be bonded to any ring carbon atom.

* * * * *